J. LEOPOLD-BRODIE.
MANUFACTURE OF SALT.
APPLICATION FILED FEB. 23, 1912.
1,181,465.
Patented May 2, 1916.
2 SHEETS—SHEET 2.
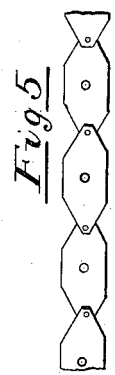
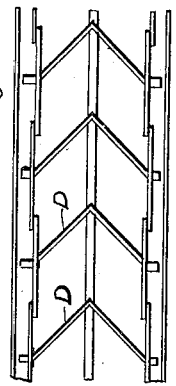
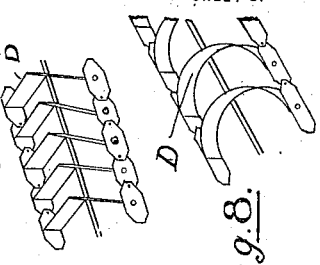
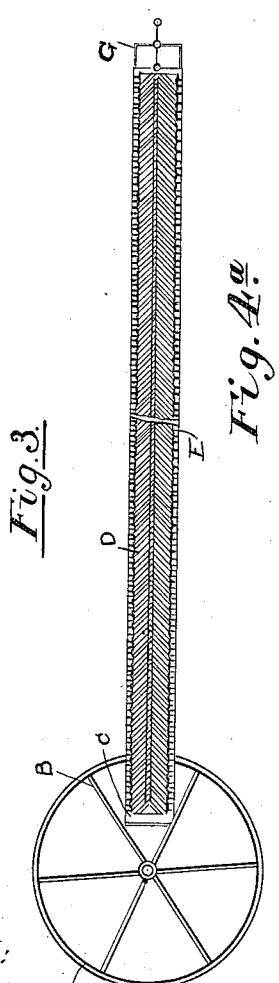
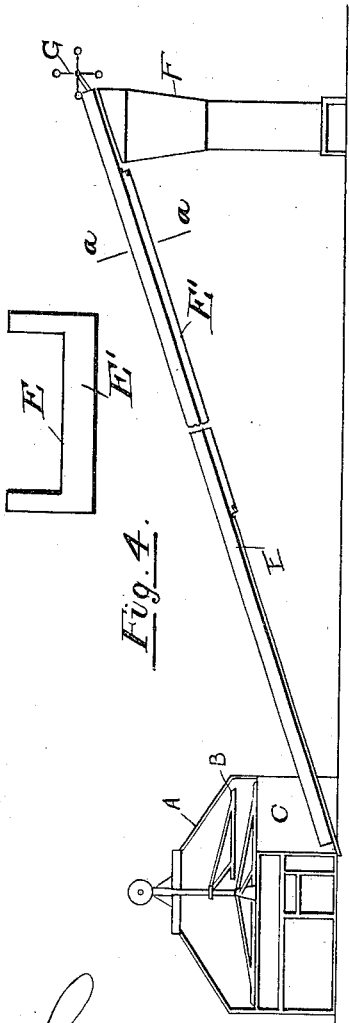
Inventor:
John Leopold-Brodie,
by Spear, Middleton, Donaldson & Spear
Attys.

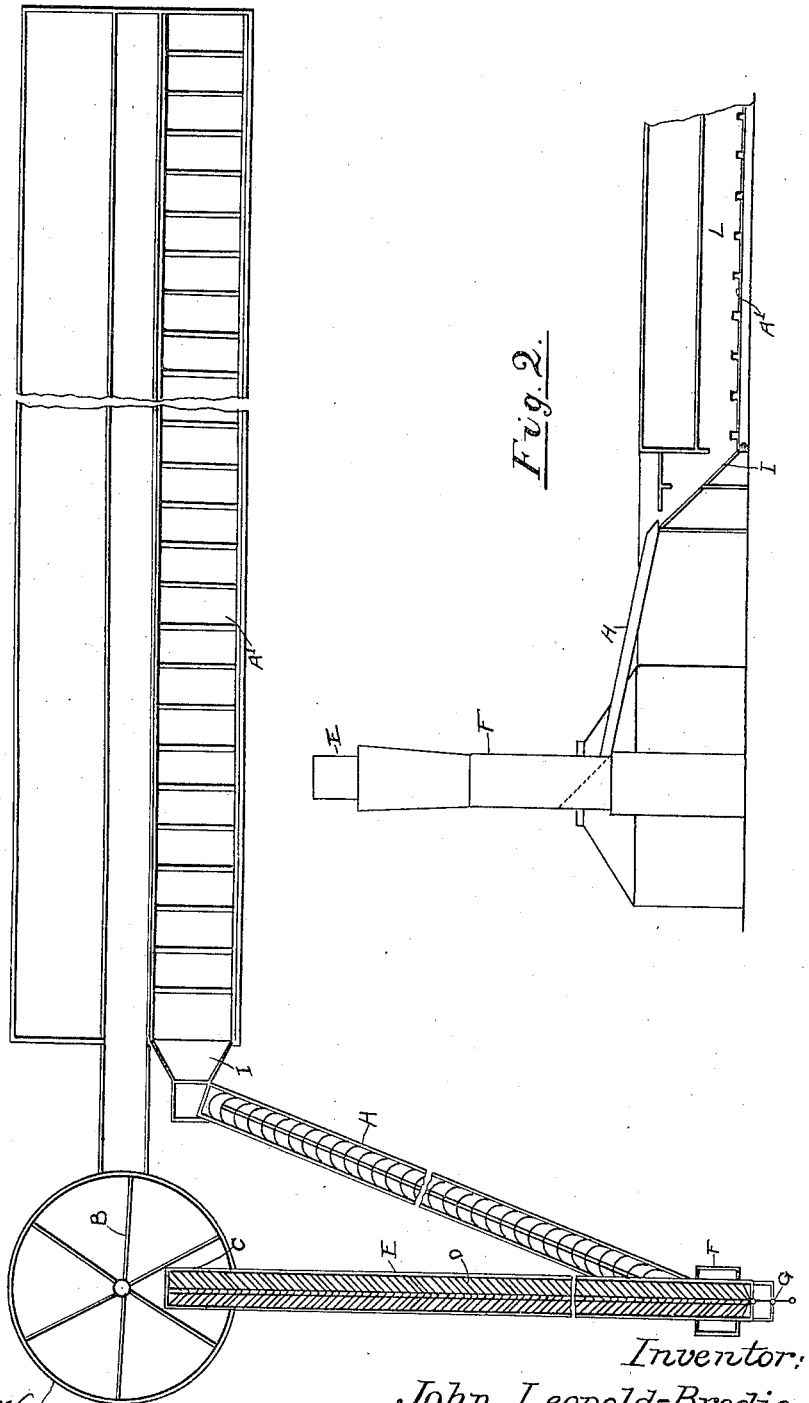

UNITED STATES PATENT OFFICE.

JOHN LEOPOLD-BRODIE, OF LONDON, ENGLAND.

MANUFACTURE OF SALT.

1,181,465.  Specification of Letters Patent.  Patented May 2, 1916.

Application filed February 23, 1912. Serial No. 679,398.

*To all whom it may concern:*

Be it known that I, JOHN LEOPOLD-BRODIE, a citizen of the United Kingdom of Great Britain and Ireland, residing at the Savoy Hotel, Strand, London, W. C., England, have invented certain new and useful Improvements in the Manufacture of Salt, of which the following is a specification.

My invention relates to the manufacture of salt, particularly to its draining and drying.

It is the object of my invention to utilize a high heat uniformly maintained to produce uniformity in the size of the crystals and also to carry the process a step beyond this. In a known process the brine is placed in a pan which is closed partially or wholly and as the salt is precipitated it is lifted by elevators to a point of discharge, mixed with hot brine; and it is my discovery that a greater amount of salt can be recovered from a given amount of hot brine, by subjecting the hot wet precipitated salt to heat after it leaves the pan, and on its way to the point of storage or use, so that crystallization is continuous until the salt is perfectly dry, after which it may be discharged into the proper receptacle and mixed with any moisture absorbent ordinarily used, such as rice starch. In this way the maximum amount of salt is produced and by the treatment I accord to it, it is ready for use at the end of the process without rehandling, thus economizing very materially the cost of production.

In order that the device for handling and drying salt may work satisfactorily it is necessary that the conveyer should be of such a nature that it will not take up any very large quantity of brine with the "mesh," and that the draining and hot drying should both proceed continuously and simultaneously from the point at which the salt is taken up by the conveyer with, at the same time, avoidance of caking and of all liability to clogging at any point. I have found that if wet salt is to be effectually treated in this way it must be laid entirely open so that the drying will (the salt being on an incline) mostly be surface drainage; also, that in order to prevent the salt from packing or becoming caked it must be divided up into small separate bodies; moreover, that great advantage is to be attained if the salt is continuously heated (as well as continuously drained) on its way from the brine pan to the next point of delivery or discharge.

In the accompanying drawing, Figure 1 shows a plan view of part of a salt plant. Fig. 2 is an elevation of the same. Fig. 3 is a plan of one of the elevators leading from the salt pan, and Fig. 4 an elevation of the same with a salt pan in section. Fig. 4$^a$ is a sectional view of the steam jacketed part of the conveyer on the line $a$—$a$ on an enlarged scale. Figs. 5, 6 and 7 show details of one form of conveyer, while Fig. 8 shows another form of conveyer.

In this drawing the salt is precipitated in the closed pan A by the known process, in which the brine is subjected to high and uniformly maintained temperature, and the scrapers B deposit the salt in the well C. From this well it is elevated by conveyers consisting of open buckets D, shown in Figs. 5, 6 and 7. The salt is discharged into the trough E, which is provided with steam jacket E' on its under side, which is supported under the conveyer trough E and fed by the steam pipe E'', so that as the salt is conveyed up the inclined trough the free liquid is drained from it, and the remaining moist crystals are heated and dried by the heat of the trough, as it passes on to the top of the elevator.

On referring to Fig. 4 it will be seen that the steam jacketing of the conveyer trough E commences at the brine level of the closed pan A and that therefore from the moment the "mesh" proceeds from that level it is continuously heated and drained. It will moreover be seen that in consequence of the construction of the conveyer in the form of a traveling ladder and without bottoms to the buckets the salt is left entirely open on its upper surface and is entirely exposed on its lower surface to the hot surface of the trough; also that the said buckets are exceedingly shallow so that there is no substantial depth or thickness of salt. Furthermore it will be seen that the salt is divided up into a number of very small portions in none of which the salt is liable to pack or cake. As the endless conveyer blades turn upwardly the salt falls through into the hopper F, and any salt which may attach itself to the scraper blades will be freed by the simple form of knocker shown at G, consisting of a shaft having four balls mounted on projecting spindles against which the blades knock as they turn over at the limit of their upward movement and as they start back down the incline. From the hopper F as shown in Fig. 2 the salt passes through a trough H also provided with scraping conveyers as shown in Fig. 8 and this trough is also heated to a crystallizing temperature and as the salt reaches the end of this trough it falls down the incline I to the endless conveyer belt A′ running through the drying chamber L and the salt from this drying chamber may be discharged into a receptacle where it may be mixed with the ordinary moisture absorbent used with table salt, such as rice starch. By the use of this apparatus I very quickly and economically handle the salt from the brine to the finished production, and obtain a maximum amount in a minimum of time, and also prevent serious loss by evaporation.

While I have described my invention in connection with the Hodgkinson process, I do not limit myself in this connection, as my invention may be used with any known process producing salt or other crystals from brine or other liquid.

What I claim as new and desire to secure by Letters Patent is:—

1. In combination with a salt pan, a trough; an endless chain of buckets operating in the trough, heating means under the trough, means in the pan for delivering salt to the buckets, said buckets being constructed to drain the liquid from the salt, a hopper adapted to receive salt from the buckets, means associated with the buckets for discharging salt therefrom, a drying chamber, means for receiving the salt from the hopper, said means adapted to discharge the salt onto an endless conveyer operating through the drying chamber, substantially as described.

2. In combination with a salt pan, a trough, buckets operating in the trough, said buckets adapted to receive brine from the salt pan, means under the trough for heating the same, means for receiving the partially dried salt from the buckets, a heating chamber, an endless conveyer operating in the heating chamber and means for discharging salt onto the endless conveyer in the heating chamber.

3. In combination with a salt pan means for conveying salt from said pan and continuously heating and draining said salt from the point of removal from the pan to the point of next delivery or discharge, said means comprising a heated inclined plane or runway, an elevator running over same, said elevator comprising a ladder-like chain of open bottomless buckets adapted to collect salt from the salt pan and move same up to the heating incline toward the point of delivery or discharge.

4. In combination with a salt pan an inclined plane or runway extending from said pan, means for heating said runway or inclined plane from a point on a level with the brine level of the salt pan and toward the upper end thereof, and means for scooping salt from the salt pan and simultaneously forming it into small uncovered bodies and dragging said bodies upward over said inclined plane or runway, with exposure to contact with the heated surface of said inclined plane or runway and also to the open air.

In testimony whereof, I affix my signature in presence of two witnesses.

JOHN LEOPOLD-BRODIE.

Witnesses:
LIONEL H. BARNARD,
HARRY HOWARD.

Copies of this patent may be obtained for five cents each, by addressing the "Commissioner of Patents Washington, D. C."